United States Patent [19]

Kronstadt et al.

[11] Patent Number: 4,691,277
[45] Date of Patent: Sep. 1, 1987

[54] SMALL INSTRUCTION CACHE USING BRANCH TARGET TABLE TO EFFECT INSTRUCTION PREFETCH

[75] Inventors: Eric P. Kronstadt, Westchester County, N.Y.; Tushar R. Gheewala, Los Angeles; Sharad P. Gandhi, Santa Clara, both of Calif.

[73] Assignee: International Business Machines Corp., Armonk, N.Y.

[21] Appl. No.: 664,275

[22] Filed: Oct. 24, 1984

[51] Int. Cl.$^4$ ............................................. G06F 13/14
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,040,030 | 8/1977 | Cassonet | 364/200 |
| 4,371,924 | 2/1983 | Schaefer et al. | 364/200 |
| 4,442,488 | 4/1984 | Hall | 364/200 |
| 4,500,959 | 2/1985 | Kubo et al. | 364/200 |
| 4,594,659 | 6/1986 | Guenther et al. | 364/200 |

OTHER PUBLICATIONS

A. Wolfe and B. Cole, "World's Fastest Microprocessor", *Electronics*, 19 Mar. 1987, pp. 61–63.
Anonymous unpublished notes of "Risc Forum", a professional society.

*Primary Examiner*—Archie E. Williams, Jr.
*Assistant Examiner*—Michael J. Ure

*Attorney, Agent, or Firm*—C. Lamont Whitham; Roy R. Schlemmer, Jr.

[57] ABSTRACT

A branch target table (10) is used as an instruction memory which is referenced by the addresses of instructions which are targets of branches. The branch target table consists of a target address table (12), a next fetch address table (14), valid entries table (16) and an instruction table (18). Whenever a branch is taken, some of the bits in the untranslated part of the address of the target instruction, i.e. the instruction being branched to, are used to address a line of the branch target table (10). In parallel with address translation, all entries of the branch target table line are accessed, and the translated address is compared to the target address table (12) entry on that line. If the target address table entry matches the target address, the instruction prefetch unit (32) fetches the instruction addressed by the next fetch address table (14) entry for the given line and the line of instructions associated with the branch address table entry is read into an instruction queue (38) having a length set by the valid entry table (16) entry which indicates how many of these instructions are valid. Otherwise, the instruction prefetch unit (32) fetches the target and subsequent instructions as it would if there were no branch target table, and the target address table entry is set to the real address of the target instruction. The next fetch address table (14) is updated so that it always contains the address of the instruction which follows the last valid instruction in the line, and the valid entries table (16) is updated so that it always counts the number of valid instructions in the line.

5 Claims, 2 Drawing Figures

SMALL INSTRUCTION CACHE USING BRANCH TARGET TABLE TO EFFECT INSTRUCTION PREFETCH

BACKGROUND OF THE INVENTION

The invention described herein generally relates to micro-processors having an on-chip instruction cache and, more specifically, to a unique architecture for such an instruction memory which is particularly suited for enhancing the performance of instruction prefetch.

Current advances in very large scale intetrated (VLSI) circuit technology permits design of high performance micro-processors with cycle times well under 100 nano-seconds. Simultaneously, the performance of dynamic memories are improving to the point where random access memory (RAM) access times can very nearly match processor cycle times. However, the time it takes to drive addresses and data off chip, generate appropriate memory chip selects, do the memory access, perform error detection, and drive back to the CPU can add several (CPU) cycles to the "system" access time of a memory. As long as the CPU is fetching data sequentially, as in sequential instruction fetches, it can prefetch far enough in advance so that it sees a constant stream of data arriving at intervals equivalent to the RAM cycle time, which, as noted above, is comparable to the CPU cycle time. However, as soon as a branch instruction occurs, the "prefetch pipeline" is broken, and the CPU must wait for several cycles for the next instruction. With current VSLI chip densities, it is possible to add a fair amount of circuitry to the "CPU" chip, some of which may be devoted to decreasing this idle time. A standard approach is to put a small instruction memory, usually an instruction cache (I-cache), on the CPU chip.

An example of a single-chip micro-processor having an instruction register with associated control decode or micro-control generator circuitry is disclosed in U.S. Pat. No. 4,402,042 issued to Karl M. Guttag. In this patent, the micro-processor communicates with external memory by a bidirectional multiplexed address/data bus. Each instruction produces a sequence of microcodes which are generated by selecting an entry point for the first address of the control read only memory (ROM) then executing a series of jumps depending upon the instruction. Operating speed is increased by fetching the next instruction and starting to generate operand addresses before the current result has been calculated and stored.

U.S. Pat. No. 4,390,946 to Thomas A. Lane discloses a pipeline processor wherein micro-instructions are held in a control store that is partitioned into two microcode memory banks. This system can support three modes of sequencing: single micro-instruction, sequential multiple micro-instructions, and multiple micro-instructions with conditional branching. When a conditional branch is performed, the branch not taken path is assumed and if true, the micro-instruction following the branch is executed with no delay. If the branch is taken, the guess is purged and, following a one clock delay, the branched to micro-instruction is executed. The Lane system supports these sequencing modes at the maximum pipeline rate.

U.S. Pat. No. 4,384,342 to Takao Imura et al discloses a lookahead prefetching technique wherein a first memory address register stores the column address and module designation portions of the current effective address, a second memory address register stores the row address portion of the current effective address, and a third memory address register stores the module designation portion of the prior effective address. Since the same module is frequently accessed many times in successsion, the average access time is reduced by starting an access based on the contents of the second and third memory address registers without waiting until the column address and module designation portions of the current effective address are available from storage in the first memory address register. The access is completed, after the column address and module designation portions of the current effective address are determined, if a comparator which is connected to the first and third memory address registers confirms that the same memory module is being successively accessed. If not, the modules are accessed again based upon the contents of the first and second memory address registers.

SUMMARY OF THE INVENTION

It is an object of the present invention to provide a new architecture for an on-chip instruction cache which is more effective than the prior art.

It is another object of this invention to provide an instruction memory architecture which uses an associative addressing scheme to provide better performance of instruction prefetch.

The objects of the invention are accomplished by providing a branch target table (BTT) as an instruction memory which is referenced by the addresses of instructions which are targets of branches. The BTT consists of a target address table (TAT), a next fetch address table (NFAT), a valid entries table (VET) and an instruction table (IT). Whenever a branch is taken, some of the bits in the untranslated part of the address of the target instruction, i.e. the instruction being branched to, are used to address a line of the BTT. In parallel with address translation, all entries of the BTT line are accessed, and the translated address is compared to the TAT entry on that line. If the TAT entry matches the target address, the instruction prefetch unit fetches the instruction addressed by the NFAT entry for the given line and the line of instructions associated with the BTT entry is read into an instruction queue having a pointer length set to the VET entry which indicates how many of these instructions are valid. Otherwise, the instruction prefetch unit fetches the target and subsequent instruction as it would if there were no BTT, and the TAT entry is set to the real address of the target instruction. The NFAT is updated so that it always contains the address of the instruction which follows the last valid instruction in the line, and the VET is updated so that it always counts the number of valid instructions in the line.

BRIEF DESCRIPTION OF THE DRAWING

The foregoing and other objects, aspects and advantages of the invention will be better understood from the following detailed description of the invention with reference to the drawings, in which.

DETAILED DESCRIPTION OF THE INVENTION

Figure 1:
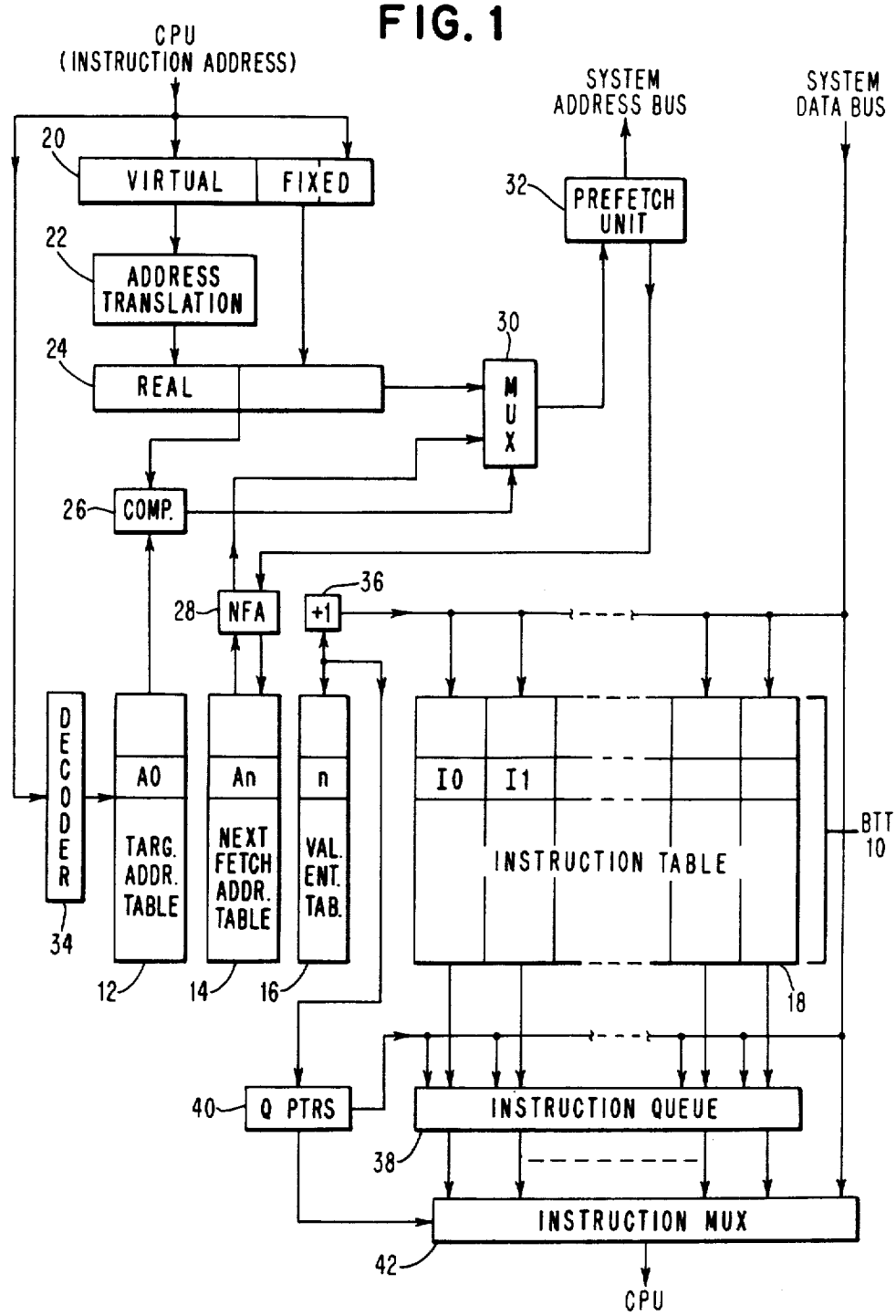
FIG. 1 is a block diagram of the basic instruction memory architecture according to the invention.

The branch target table (BTT) is an instruction memory which is referenced by the addresses of instructions which are targets of branches. The following discussion describes a one-way associative addressing scheme; as indicated later, greater associativity provides better performance.

With reference to the drawing, the BTT 10 consists of a target address table (TAT) 12, a next fetch address table (NFAT) 14, a valid entries table (VET) 16 and an instruction table (IT) 18. The CPU generated branch target instruction address is supplied to a first address register 20. This address includes a virtual part and a fixed part. The virtual part of the address is supplied to an address translation unit 22 which generates the real address for storing in a second address register 24. The fixed part of the address stored in register 20 is directly read into corresponding locations of register 24. An address comparator 26 compares entries in TAT 12 with the branch target real address generated by the address translation unit 22 and stored in register 24. A next fetch address register 28 communicates with the NFAT 14 and supplies a branch address to address multiplexer 30. The other input to multiplexer 30 is supplied from register 24 and, depending on the output of comparator 26, the contents of register 24 or of register 28 are supplied to the CPU's instruction prefetch unit 32. The instuction prefetch unit 32 also communicates directly with register 28 which in turn provides addresses for reading into the NFAT 14.

A portion of the fixed address stored in register 20 is also supplied to a decoder 34 which addresses a line on the BTT 10. In addition, there is provided an incrementer 36 for incrementing entries in the VET 16. An instruction queue 38 is fed by the instruction table (IT) 18 of the BTT 10 and is addressed by queue pointers in register 40 supplied by the VET 16. Instructions to be delivered to the CPU are selected by an instruction multiplexer 42.

Whenever a branch is taken, some of the bits in the untranslated part of the address of the target instruction (the instruction being branched to) are used to address a line of the BTT 10. In parallel with the address translation, all entries of the BTT line are accessed. The translated address is compared to the TAT entry on that line. If the TAT entry matches the target address, the instruction prefetch unit 32 fetches the instruction addressed by the NFAT 14 entry for the given line, and the line of instructions associated with the branch address table entry is read into the instruction queue 38 having a length set by the VET 16 entry which indicates how many of these instructions are valid. Otherwise, the instruction prefetch unit 32 fetches the target and subsequent instructions as it would if there were no BTT and the TAT entry is set to the real address of the target instruction. The NFAT 14 is updated so that it always contains the address of the instruction which follows the last valid instruction in the line, and the VET 16 is updated so that it always counts the number of solid instructions in the line.

The operation will be better understood from a consideration of the following examples.

Case 1: The TAT entry does not match the target address. This would happen, for example, the first time the branch is taken. In this case, the instruction prefetch unit 32 fetches the target and subsequent instruction as it would if there were no BTT, and the TAT entry is set to the real address of the target instruction. As the target and subsequent instructions arrive on the CPU chip, they are delivered to the CPU for processing and simultaneously entered into the instruction table part of the BTT in the line associated with the target address. The target instruction occupies the first instruction location on this line, and subsequent instructions are placed in subsequent instruction locations on the line until either the line is filled, or another branch is taken. The NFAT entry for the line is updated so that it always contains the address of the instruction which follows the last valid instruction in the line. The VET 16 is updated so that it always counts the number of valid instructions in the line.

Case 2: The TAT entry matches the target address. In this case, the instruction prefetch unit fetches the instruction addressed by the NFAT entry for the given line. Simultaneously, the line of instructions associated with the BTT entry is read into instruction queue 38, with queue length set to the VET entry which indicates how many of these instructions are valid. The instructions in the queue are immediately available to the CPU so that it is not sitting idle during the time required to refill the prefetch pipeline. Note that the prefetch unit 32 will fetch the instruction following the last valid instruction in the queue. As that and subsequent instructions arrive on the CPU chip, they are placed at the end of the queue or delivered to the CPU for processing, and if there is room in the BTT line, simultaneously entered into the instruction table part of the BTT. The NFAT 14 is updated so that it always contains the address of the instruction which follows the last valid instruction in the BTT line. The VET 16 is updated so that it always counts the number of valid instructions in the BTT line.

As described above, the scheme for indexing into the BTT is one-way associative; in other words, there is only one BTT line for each different value that can be taken on by that portion of the target address that is used to index into the BTT. This is the simplest scheme. One can easily construct an n-way associative BTT. In this case, n lines of the BTT would be simultaneously addressed by a portion of the target instruction address, and the TAT entries for each of these lines would be compared to determine which line of the BTT contained the information for that target instruction. If no match were found, then one of the entries in the "associativity class" would have to be discarded (using a standard least recently used (LRU) algorithm) to make room for the information on the current branch. This technique is very effective in improving performance at the expence of some additional logic.

Figure 2:
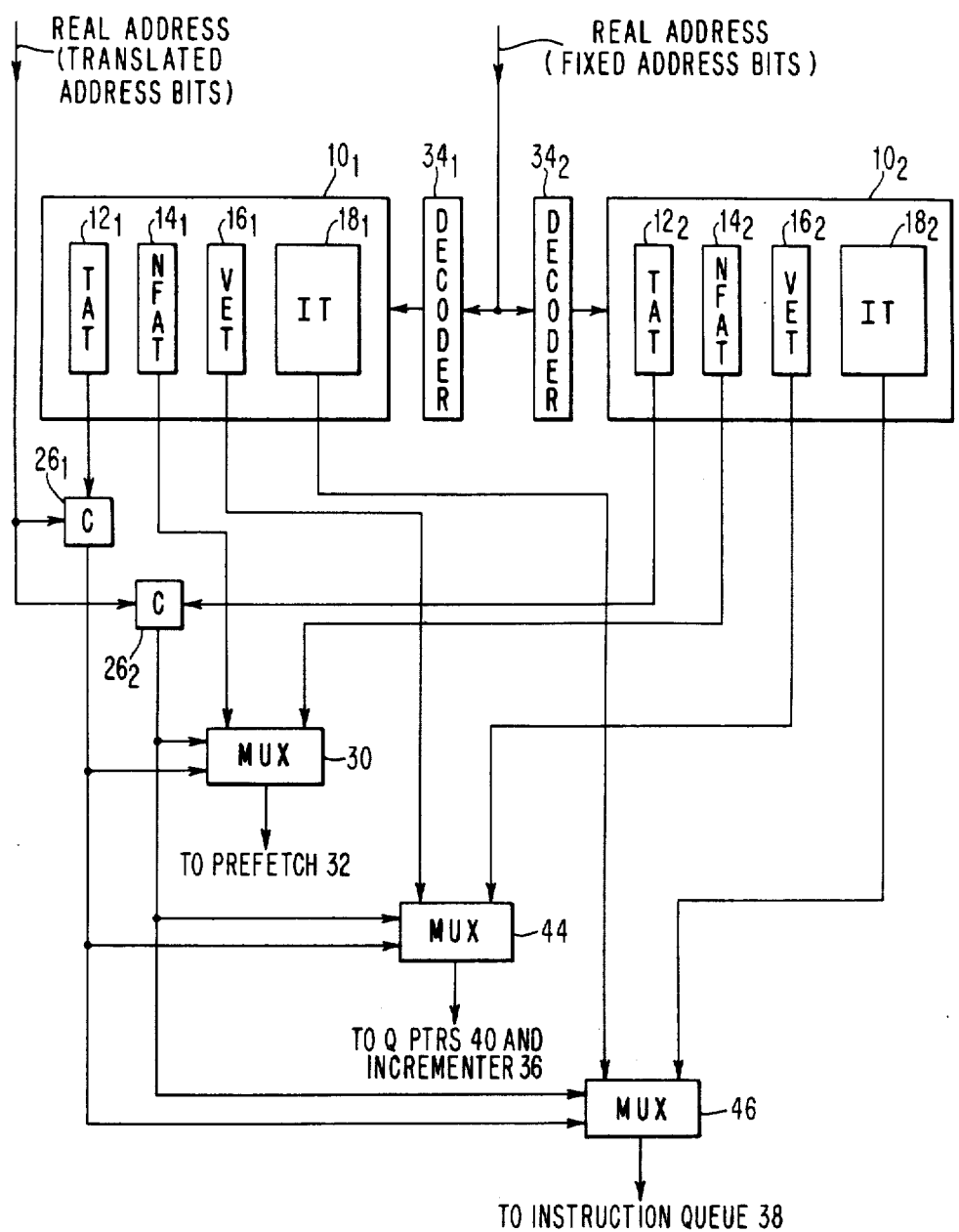
FIG. 2 is a block diagram of the additional logic required for the example of a two-way set associative BTT configuration.

An example of the logic required for a two-way set associative BTT configuration is shown in FIG. 2. Two BTTs $10_1$ and $10_2$ with corresponding TATs $12_1$ and $12_2$, NFATs $14_1$ and $14_2$, VETs $16_1$ and $16_2$, and ITs $18_1$ and $18_2$ are provided. The fixed address bits from register 20 are supplied to associated decoders $34_1$ and $34_2$ to address lines on BTTs $10_1$ and $10_2$, respectively. The translated address bits from register 24 are compared in comparators $26_1$ and $26_2$ with target addresses from TATs $12_1$ and $12_2$. The outputs of these comparators are provided as control inputs to multiplexers 30, 44 and 46. The output of multiplexer 30 is supplied to the instruction prefetch unit 32 as before. Multiplexer 44 receives as inputs the outputs of VETs $16_1$ and $16_2$ and provides an output to the queue pointer register 40. Multiplexer 46 receives as inputs the outputs of instruction tables 18₁ and 18₂ and provides outputs to the instruction queue 38.

In the above discussion, it was also assumed that when a branch was taken to a target instruction corresponding to an entry in the BTT, prefetching of the instruction addressed by the NFAT entry begins immediately. This may not be necessary if the number of valid instructions in the BTT line is greater than the number of CPU cycles required to obtain that instruction. One could have some additional logic associated with the instruction queue, so that if the length of the queue is greater than a certain constant (equal, for example, to the number of CPU cycles required to complete a memory access, including all system access overhead), then no prefetching is done. This causes less traffic on the memory bus and reduces contention for instruction and data accesses.

There is no prefetching in a standard I-cache. When a cache miss occurs, an entire cache line is read from main memory. The penalty for a cache miss is at least as large as the full memory system access time plus the CPU cycle time multiplied by the number of words in the cache. In some cache implementations, instructions are made available to the CPU as they are loaded into the cache (as in the present invention) so this last component of the miss penalty may be reduced. However, it is frequently the case that in filling a cache line, one fetches and caches instructions that are never used.

On a standard I-cache, a miss can occur on any instruction access. BTT misses can only occur on "taken" branches, i.e. the execution of conditional branches for which the condition does not hold does not involve the BTT. Thus, if roughly 16% of all instructions are taken branches, a 40% hit ratio in the BTT would be roughly equivalent to a 90% hit ratio on a standard I-cache. It is apparent that in situations where only a small amount of memory is available for on chip instructions storage, a BTT according to the present invention has advantages over a standard I-cache.

The table below contains comparative performance figures for a micro-processor system using a BTT and an I-cache of differing sizes.

|  | Relative Performance | Hit Ratio |
|---|---|---|
| ½-K I-Cache (4 way associative) | 1.00 | 79% |
| 1-K I-Cache (4 way associative) | 1.06 | 83% |
| ½-K BTT (1 way associative) | 1.15 | 40% |
| 1-K Btt (1 way associative) | 1.17 | 49% |

The system consists of a CPU and a BTT/I-cache management unit on one chip and a separate memory system. The memory system is composed of ripple mode memories which are configured so that over 90% of all CPU accesses to memory (instruction and data) involve a DRAM cycle time which is less than or equal to the CPU cycle time, while system access time adds three additional CPU cycles. The system contains one address bus and one bus for instruction and data. The results are based on a single set of trace tapes, representing a high level language compilation. The I-cache was 4-way set associative with either 8 or 16 associativity classes, each containing four sixteen byte lines. (Eight classes corresponds to a ½-K cache size, 16 classes to a 1K cache.) The BTT was only one-way associative and had either 16 or 32 lines (corresponding to ½-K or 1K BTT sizes) with room for seven instructions on each line. System modelling includes loads and stores as well as instruction fetches, so that contention for the single data bus is included in these figures. The performance numbers in the table are normalized to the performance of the ½-K I-cache configuration. Note that the difference between I-cache performance and BTT performance would be more pronounced if the associativity of the two were the same.

We claim:

1. An instruction memory architecture for a microprocessor comprising:

a branch target table including a target address table, a next fetch address table, a valid entries table and an instruction table;

instruction address register means for storing a target address generated by said microprocessor;

decoder means responsive to said instruction address register means for addressing all entries of an addressed line of said branch target table whenever a branch is taken;

comparator means connected to the outputs of said instruction register means and said target address table for providing an output indicative of a match between the target address and the accessed target address table entry on said addressed line; and instruction prefetch means connected to said instruction address register means and said next fetch address table and responsive to the output of said comparator means for fetching the instruction in the accessed next fetch address table if said target address table entry matches the target address, otherwise for fetching the target and subsequent instructions from main memory, said next fetch address table entry for the line being updated so that it always contains the address of the instruction which follows the last valid instruction in the line and said valid entries table being updated so that it always counts the number of valid instructions in the addressed branch target table line.

2. The instruction memory architecture as recited in claim 1 wherein said instruction address register means comprises:

a first register for storing an address having a virtual part and a fixed part, said address being the target address generated by said microprocessor, at least some of the bits in the fixed part of said address being supplied to said decoder means;

address translation means connected to said first register and responsive to the virtual part of said target address for generating a corresponding real address; and a second register connected to receive the real address from said address translation means and the fixed part of said target address stored in said first register, said comparator means receiving said real address stored in said second register for comparison with the accessed target address table entry.

3. The instruction memory architecture as recited in claim 1 further comprising:

instruction queue means connected to said instruction table for receiving instructions to be supplied to said microprocessor; and queue pointer register means connected to said valid entry table for storing pointers which address said instruction queue means.

4. The instruction memory architecture as recited in claim 1, said architecture being n-way set associative further comprising:
- at least a second branch target table having a target address table, a next fetch address table, a valid address table and an instruction table;
- at least a second decoder means responsive to said instruction register means for addressing all entries of a line of said branch target table whenever a branch is taken;
- at least a second comparator means connected to the outputs of said instruction address register means and said target address table of said second branch target table for providing an output indicative of a match between the target address and the accessed target address table entry on said accessed line; and
- selection means controlled by the outputs of said comparators for providing the outputs of one of said instruction tables to said microprocessor.

5. A method of operating an instruction memory architecture for a microprocessor, said instruction memory architecture comprising a branch target table having a target address table, a next fetch address table, a valid entries table and an instruction table, said method comprising the steps of:
- referencing said branch target table by the addresses of instructions which are targets of branches, all entries of an addressed line of said branch target table being accessed whenever a branch is taken,
- comparing the target address with the target address table entry on said addressed line and, if said target address table entry matches the target address,
- fetching the instruction addressed by said next fetch address table entry, otherwise fetching the target and subsequent instructions from main memory,
- updating the next fetch address table entry for the addressed branch target table line so that it always contains the address of the instruction which follows the last valid instruction in the line, and
- updating the valid entries table so that it always counts the number of valid instructions in the addressed branch target table line.

* * * * *